June 13, 1961 W. S. FORREST 2,988,120
APPARATUS FOR MANUFACTURING A COMPOSITE WOOD PRODUCT
Filed Oct. 31, 1957 5 Sheets-Sheet 3
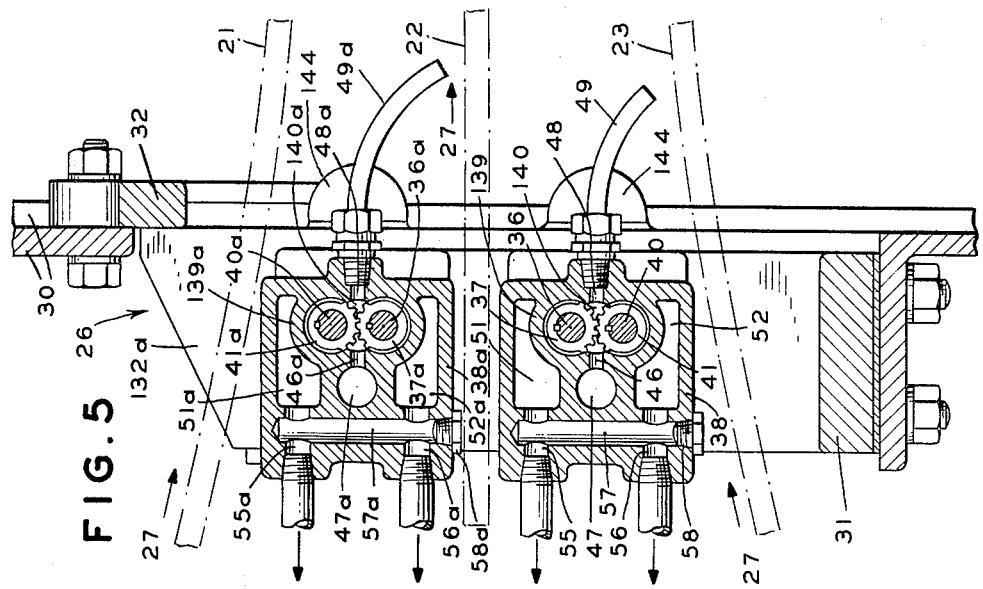
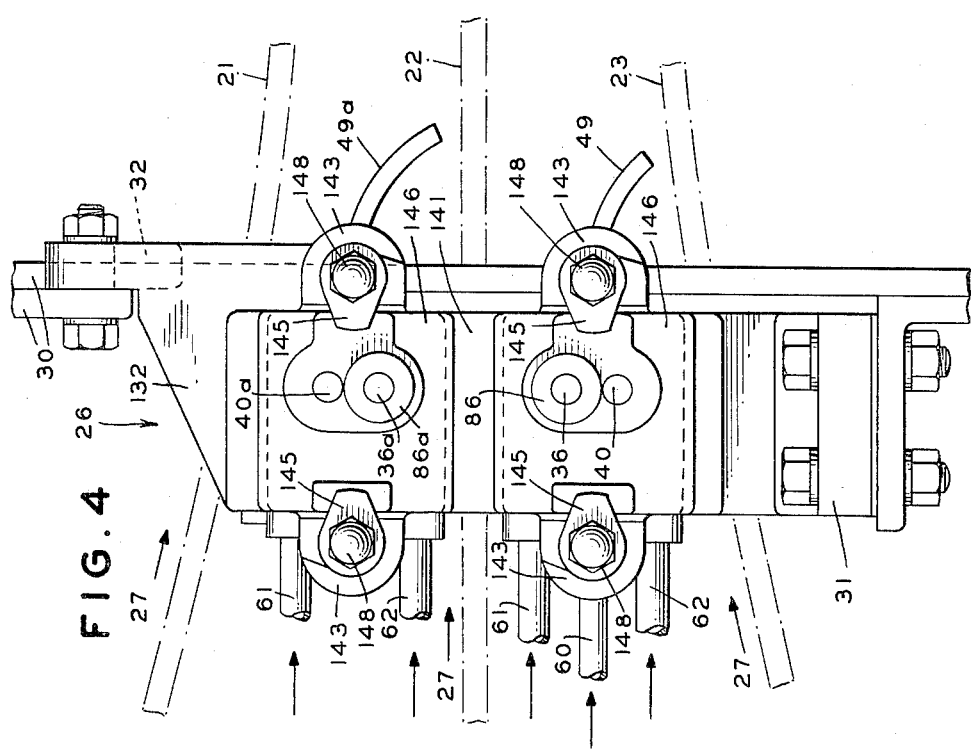

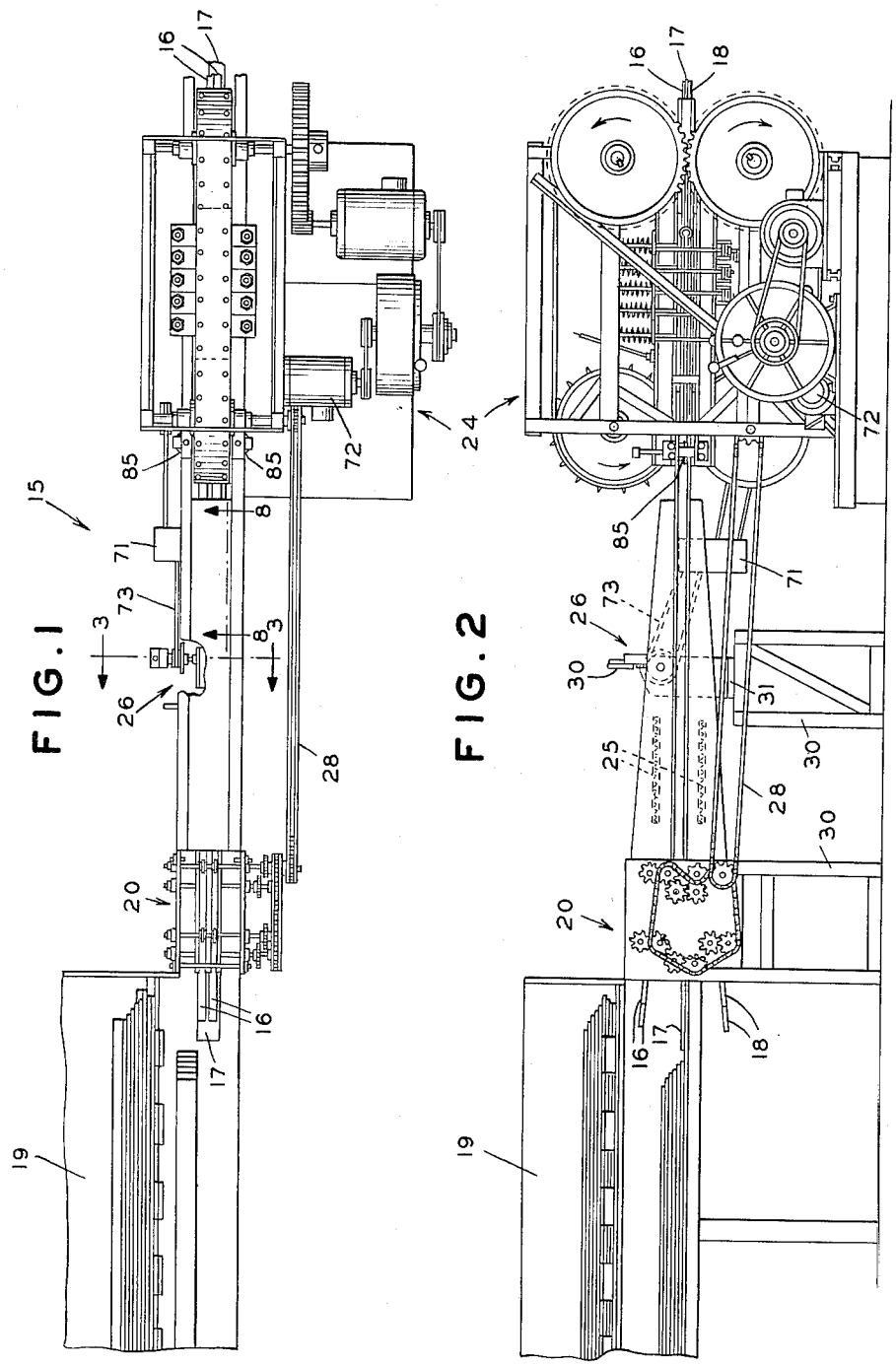

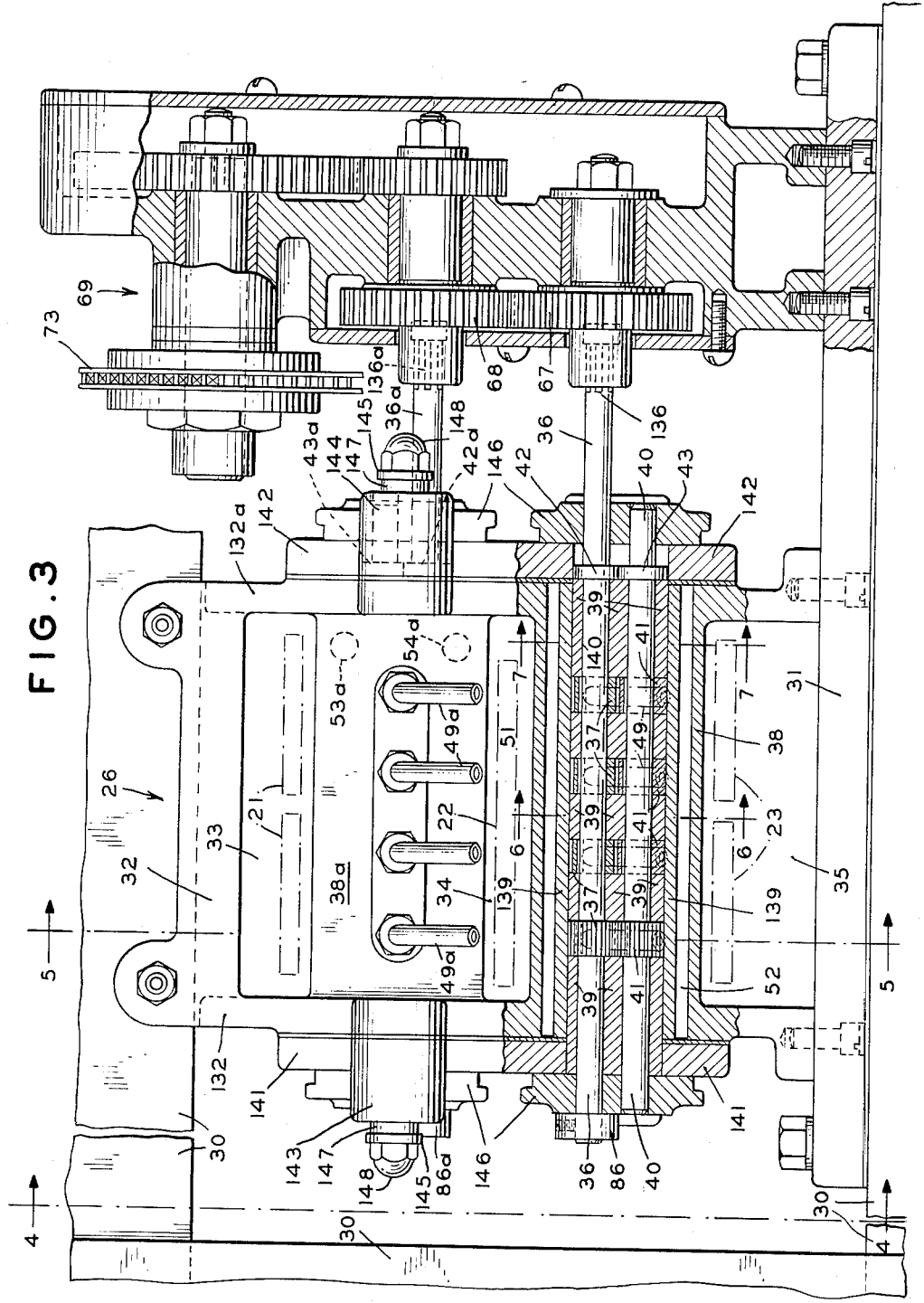

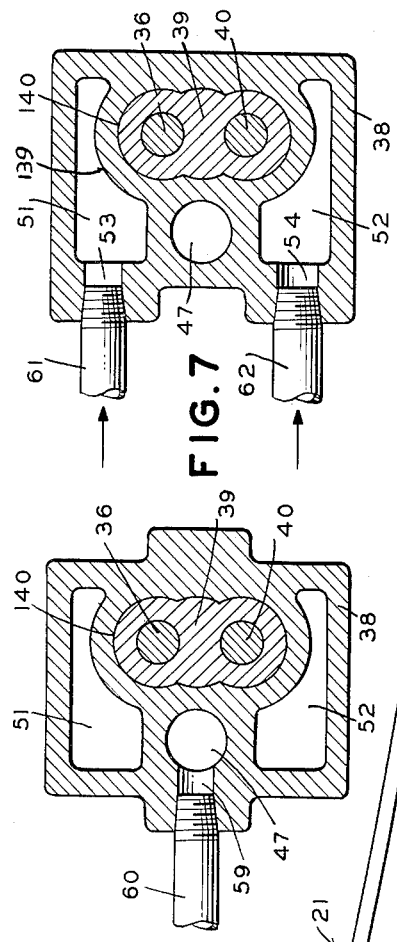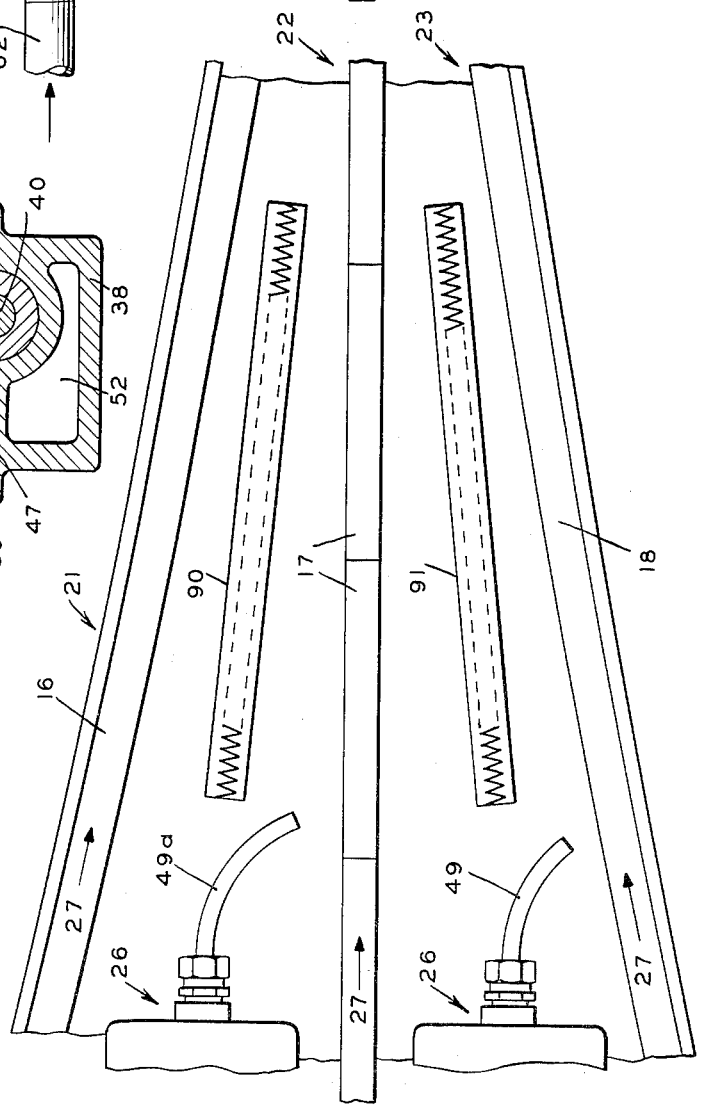

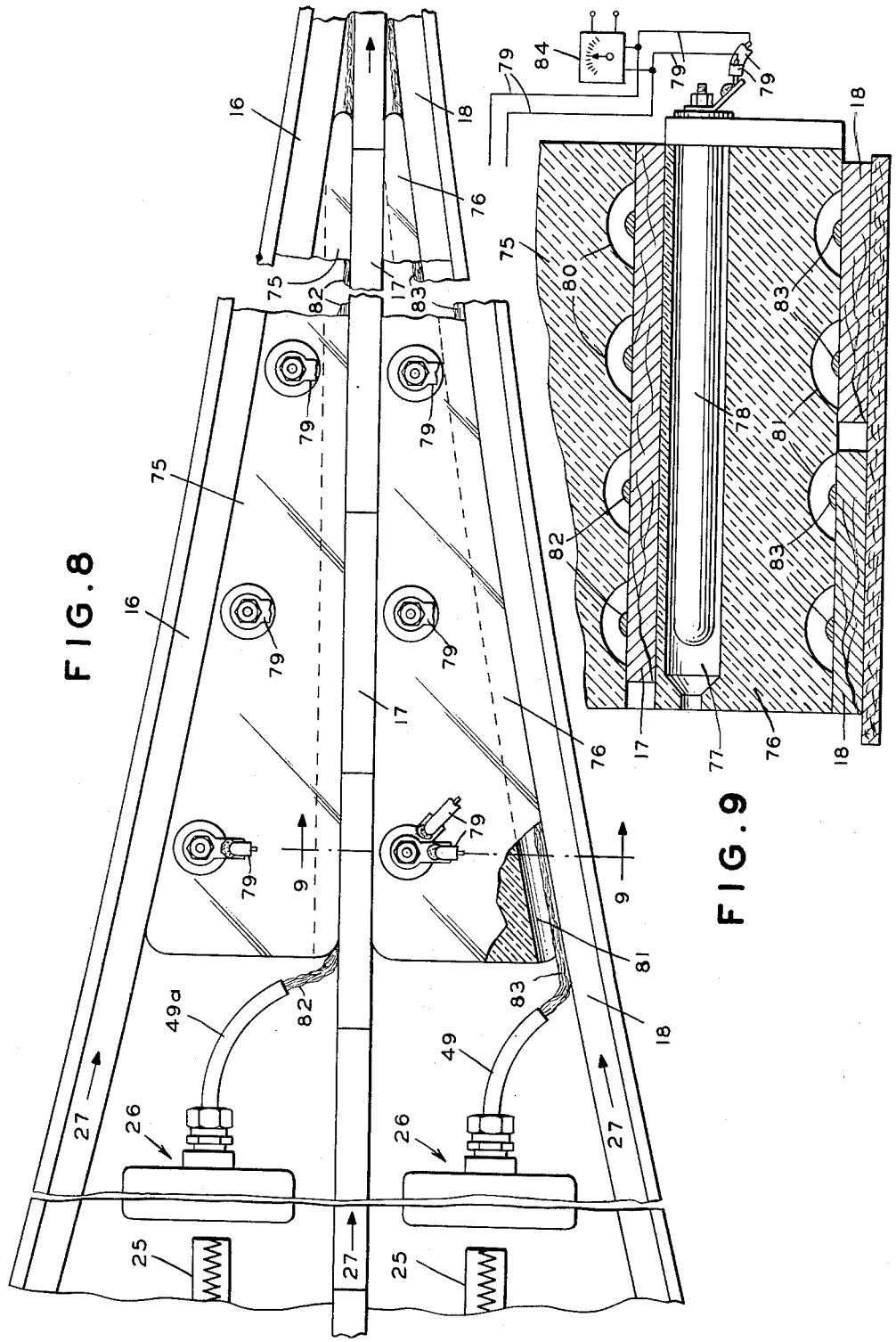

United States Patent Office 2,988,120
Patented June 13, 1961

2,988,120
APPARATUS FOR MANUFACTURING A COMPOSITE WOOD PRODUCT
Wayne S. Forrest, Wentworth, N.H., assignor to The Crandell Corporation, Warren, N.H., a corporation of Delaware
Filed Oct. 31, 1957, Ser. No. 693,743
7 Claims. (Cl. 144—279)

This invention relates to apparatus for the manufacture of composite or laminated wood products, and more particularly to apparatus for continuously feeding and bonding two or more layers of wood by means of glue applied therebetween.

In United States Patent No. 2,729,584 to Warren Curtis Foster, assigned to the assignee of the present application, there is shown a machine for continuously forming laminated wood products in which two or more layers of boards are conveyed along gradually converging paths while first heat and then glue is applied between the surfaces thereof to be joined, and in which the layers of boards, after being brought together, are fed through a press to form a continuous, composite, laminated strip of wood. Apparatus constructed in accordance with said patent has proven to be admirably well suited to the commercial manufacture of such laminated composite products particularly where the high degree of efficiency required in mass production is desired. However, such apparatus requires close supervision and attention to avoid more or less glue than the prescribed amount being fed to the surfaces to be joined. This is especially true when there is a variation in the rate at which the work is fed through the machine.

In such apparatus, the temperature at which the heated wood surfaces enter the press is also affected by a variation in the rate at which the work is fed through the machine. For example, when the machine is operated at a somewhat reduced rate of feed, as may be the case when it is first put into operation after having been shutdown, there may be excessive heat loss as the work travels from the glue applying means to where the members are pressed together.

It is, therefore, a principal object of this invention to provide an improved apparatus for manufacturing a composite wood product wherein a predetermined amount of bonding material relative to a unit area of the work to be bonded is applied to the work independent of variations in the rate at which the work is fed.

Another object is to provide such an apparatus in which bonding material is applied to the continuously advancing surface of a workpiece to form a plurality of substantially uniform glue lines, the rate of feed of the bonding material being maintained in a predetermined relation to the rate at which the work is fed thereby providing substantial uniformity from end to end of each glue line as well as from one line to another.

It is a further object of this invention to provide such an apparatus wherein thermosetting glue is applied to the hot surface of a continuously advancing work piece to form a plurality of spaced glue lines thereon wherein heat loss from the hot surface is controlled as it travels from the glue applying means to the press.

In accordance with important features of the present invention, glue feeding means are provided which are adapted to be driven from the same drive mechanism which serves to drive the press and the board feeding means. The glue applying means is adapted to lay down the glue in the form of continuous lines on one or more board surfaces as the boards are fed past the glue applying means along paths which converge as the boards enter the press. In the preferred embodiment of the invention a plurality of positive displacement pumps is provided to insure uniform delivery of glue at each of a plurality of glue orifices, the pumps being driven at a rate which is automatically controlled by the rate at which the wood is fed through the apparatus.

In accordance with a further feature of the present invention, heating means are provided between the glue applying means and the press so that undesired temperature variations such as may occur when the rate of feed of the boards is varied, are avoided.

Further objects as well as advantages of this invention will be apparent from the following description and the accompanying drawings in which FIGURE 1 is a plan view of an apparatus for manufacturing a composite wood product constructed in accordance with the present invention;
FIGURE 2 is a side elevational view thereof;
FIGURE 3 is a cross-sectional view taken along the line 3—3 of FIGURE 1;
FIGURE 4 is a side elevational view from the point of view of the line 4—4 of FIGURE 3 in the direction indicated;
FIGURES 5, 6 and 7 are cross-sectional views taken respectively along the lines 5—5, 6—6 and 7—7 of FIGURE 3;
FIGURE 8 is a sectional view along the line 8—8 of FIGURE 1;
FIGURE 9 is a sectional view through the line 9—9 of FIGURE 8; and
FIGURE 10 is a fragmentary view, similar to FIGURE 8 but shows a modification of the heating members.

Referring now to the drawings, apparatus 15 in the present instance is adapted to produce triple ply wood flooring from wood strips 16, 17, 18 forming respectively the top, center and bottom plies of the finished product. The wood strips may be fed in any suitable manner from bin 19 into feeding means 20 which frictionally engages each of the strips and delivers them along respective paths 21, 22 and 23 which converge towards a press 24. The wood strips in traveling from feed means 20 to the press 24 first pass heating means 25 and then glue applying means 26 as most clearly shown in FIGURE 4, arrows 27 indicating the direction of travel of the wood strips.

Except as will be pointed out in detail hereinafter, feed means 20, heating means 25 and the press 24 may be constructed as shown and described in said Patent No. 2,729,584. The present apparatus is adapted to the manufacture of wood flooring and in the present instance two strips of wood 16 are fed in side by side relation along path 21. Similarly, two strips 18 are fed in side by side relation along path 23. The strips 16 which ultimately will form the top or exposed surface of the finished product are selected of the desired grade while strips 18 forming the bottom layer or ply may be of any common wood selected without regard to defects which would render it unsuitable for use as a top surface layer. The center ply need not be in the form of continuous strip lengths of wood, and in the present instance is formed of short strips about 2¼" x 4¾" which are fed with their short side extending along the feed path in the direction of arrow 27. Where, as shown, three plies are joined to form the finished product the glue applying means is adapted to deliver glue to the upwardly presented surfaces of the strips 17 and 18 forming respectively the center and bottom plies of the finished product.

As shown most clearly in FIGURES 1-4, the apparatus includes support members 30 which serve to support a bed plate 31 and between which and an overhead support member 30 there is secured the glue applying means indicated generally at 26. The glue applying means comprises an integral, one-piece generally rectangular casting having an upper transverse member 32 and a pair of side members 132, 132a which extend rearwardly toward feed means 20 in opposed, spaced relation. Two casings 38, 38a extend transversely between and are integral with side members 132, 132a. Casings 38, 38a extend in parallel mutually spaced relation and with transverse member 32 form three through openings 33, 34 and 35 aligned to register respectively with feed paths 21, 22 and 23.

Casing 38 will now be described in detail and, because casings 38 and 38a and their appurtenances are identical, description of the one will suffice for both. Referring now to FIGURES 3-7 in detail, casing 38 is open ended and its interior is divided by internal walls 139 into four passages or compartments. Extending longitudinally through compartment 140 is a shaft 36 carrying gear-like members 37 which are fixed thereto and spaced by spacers 39. A second shaft 40 also extends through compartment 140 in parallel relation with shaft 36 and, as shown in FIGURE 3, passes through spacers 39. Gear-like members 41 are fixed to shaft 40 to register with the corresponding gear-like members 37 on shaft 36 between spacers 39. Shaft 36 is the main drive shaft of the unit and is removably joined, as by a splined coupling, indicated at 136, to a suitable driving assembly 69. Adjacent to one end thereof, shaft 36 has fixed thereto a collar 42 while shaft 40 has a collar 43 fixed thereto for purposes to be pointed out hereinafter. The ends of casing 38 are closed by suitable gaskets and seal plates 141, 142, which, as shown, also serve to close the ends of casing 38a. Each of the seal plates has an aperture registering with shafts 36 and 40 through which the latter extend. The aforementioned collars 42 and 43 are located in the aperture formed in seal plate 142.

As has been indicated, casing 38a is identical in construction to casing 38 and the parts of the latter thus far described have an exact counterpart in casing 38a designated by the same reference character but with the letter "a" added as a suffix. Thus, shafts 36a and 40a extend through compartment 140a in casing 38a, shaft 36a carrying gear-like members 37a and shaft 40a carrying gear-like members 41a each registering with a corresponding one of the members 37a and separated by spacers corresponding to spacers 39. Shaft 36a is also removably connected as by means of a splined coupling 136a to driving assembly 69.

It is to be noted that the relative positions of shafts 36a and 40a are reversed as compared to shafts 36 and 40. Consequently, even though shafts 36 and 36a are rotated in opposite directions, the pumping action of gear-like members 37a and 41a will be in the same direction, toward press 24, as that of corresponding members 37 and 41. As shown, collar 42a is fixed on shaft 36a and collar 43a is fixed to shaft 40a.

Seal plates 141 and 142 have bosses 143 and 144 respectively formed thereon to receive studs 147 which thread into side members 132 and 132a. Nuts 148, threaded on studs 147, serve to secure seal plates 141 and 142 and to draw thereagainst, by means of dogs 145, bushings 146 which receive and rotatably support the four shafts 36, 40 and 36a, 40a.

Referring once again to casing 38 and as most clearly shown in FIGURE 5, each pair of gear-like members 37 and 41 is mounted for alignment with a bore 46 which communicates with a glue distributing passage or compartment 47 extending transversely of and formed in casing 38. Due to the meshing of gear-like members 37 and 41, rotation of shaft 36 causes rotation of shaft 40 in the opposite direction with both shafts being rotated so that each pair of meshing gear-like members 37 and 41 forces the glue arriving through the associated bore 46, out through an outlet bore 48 which communicates with a nozzle 49. There is an inlet bore 46 provided for each pair of gear-like members 37, 41 which affords communication with compartment 47. Similarly, an outlet bore 48 and a delivery nozzle 49 is also provided for each pair of gear-like members 37, 41. Each of the delivery nozzles 49 extends toward press 24 in the spaces between the paths along which the juxtaposed board strips are advanced when the machine is in operation. Because of the positive action of the pumps formed by each of the pairs of gear-like members 37, 41 nozzles 49 may extend an appreciable distance along the feed paths without affecting the uniformity of the quantity of glue delivered to the boards which remains a function of the rate at which the gear-like members 37, 41 are rotated.

The inner wall 139 which together with the outer wall of the casing 38 forms compartment 140 and the bore through which drive shaft 36 and shaft 40 extend, also forms therewith a pair of elongated chambers 51, 52 through which a suitable medium is passed to control the temperature of the glue in compartment 47 as well as in the space adjacent each of the pairs of gear-like members 37, 41. As shown in FIGURE 7, chambers 51 and 52 are provided with inlet ports 53 and 54 respectively through which a suitable fluid medium may pass into chambers 51 and 52. The fluid medium, as shown in FIGURE 5, passes out through outlet ports 55 and 56. Bore 57 affords communication with a drain opening 58 common to both chambers 51, 52 to facilitate complete drainage of the casing when desired.

As most clearly shown in FIGURE 6, compartment 47 communicates through an inlet 59 with a conduit 60 which in turn communicates with a source (not shown) of thermosetting glue. Said source of thermosetting glue may be of any suitable construction, as for example, as set forth in said Patent No. 2,729,584 where the glue is maintained at a suitable temperature and pressure to insure delivery in the proper condition to the glue applying means. When the properties of the glue used permit, the flow of glue from the source of supply through conduit 60 may be accomplished by means of a gravity feed arrangement.

The inner wall 139a of casing 38a in like manner forms two chambers 51a, 52a provided respectively with inlet ports 53a, 54a (indicated by dotted lines in FIGURE 3) and outlet ports 55a, 56a which communicate through bore 57a with drain opening 58a. Compartment 47a communicates through an inlet corresponding to inlet 59 with glue conduit 60.

As indicated in FIGURE 3, shafts 36 and 36a are connected respectively to gears 67, 68 of a conventional gear drive indicated generally at 69 which is connected by a chain 73 to a speed regulator 71 which is in turn connected to the motor 72 through the press drive mechanism, the motor also serving to drive the board feed means 20 and the press 24.

Referring now to FIGURES 8 and 9, in advance of press 24 and following the glue applying means 26 and supported from support members 30, there is mounted a second pair of heating members 75, 76, heating member 75 being disposed between feed paths 21, 22 and heating member 76 being disposed between feed paths 22, 23. The heating members 75 and 76 are of substantially identical construction and, as shown in detail in FIGURE 9 in connection with heating member 76, are provided with chambers 77 in which electrical heating elements 78 are mounted. Heating elements 78 are connected by leads 79 through a rheostat 84 to a suitable source of electrical power (not shown). The lower surface of each of the heating members 75, 76 is provided with a plurality of channels 80 and 81 respectively which extend longitudinally along the feed paths. Each of the channels 80 registers with one of the glue lines 82 laid down along the upwardly presented surface of wood strips 17 while each of the channels 81 registers with one of the glue lines 83 laid down on the upwardly presented surface of wood strips 18. The upper surface of heating member 75 engages the downwardly presented surface of wood strips 16. In like manner, the upper surface of heating member 76 engages the downwardly presented surface of strips 17.

As the strips 16, 17 and 18 converge before entering press 24 and upper and lower strips 16 and 18 are forced longitudinally together by a pair of guide rollers mounted on opposite sides of the press as indicated at 85 (FIGURES 1 and 2). As has been indicated, press 24 may be constructed as shown and described in said Patent No. 2,729,584. The press is long enough and exerts sufficient pressure upon the board strips that a secure bond is formed by the thermosetting glue. The rate of travel through the press is adjusted so that the thermosetting glue cures to a sufficient extent to permit the laminated boards to leave the press without damage to the bond between the layers.

In operation the wood strips 16, 17 and 18 are fed along paths 21, 22 and 23 respectively by feed means 20 driven through chain 28 and the press drive from motor 72. As the wood strips pass below nozzles 49 and 49a, lines of thermosetting glue 82, 83 are deposited thereon. The glue is maintained at optimum temperature as it passes through the casings 38 and 38a due to the fluid medium in chambers 51 and 52. The fluid medium utilized is conveniently water which is cooled or heated as required, before it passes along conduits 61 and 62 into the respective chambers through ports 53, 54 and 53a, 54a.

While the glue is under pressure within compartments 47 and 47a, delivery of the glue from the compartments to each of the outlet bores 48 and 48a is controlled by the gear-like members 37, 41 and 37a and 41a. The rate of rotation of the gear-like members which controls the amount of glue fed is in turn controlled by the rate at which the press 24 is operated. Consequently, once speed regulator 71 is adjusted to provide a predetermined amount of glue per unit length of the board strips as they are fed past the nozzles, the amount does not vary even though the rate at which the board strips are fed through the machine is varied. Thus, when the press is stopped, the feeding of the glue is stopped. Similarly, the amount of glue fed varies proportionally as the rate of board feed is increased or decreased.

Heating members 75 and 76 facilitate the control of the temperature of the board strips and the thermosetting glue. The temperature of heating members 75 and 76 may be readily raised or lowered as required by the rate of travel of the board strips between the glue applying means 26 and the press 24 by means of rheostat 84 which controls the electrical power delivered to the heating elements. Under certain conditions no heat may be required from members 75 and 76. However, when the distance between the glue applying means and the press is great enough or the rate of travel of the board strips low enough, the temperature of heating members 75 and 76 may be more or less raised.

It is apparent from the foregoing that there is provided in accordance with the present invention, an improved wood laminating machine capable of manufacturing, at high speed, a laminated wood product having greatly enhanced freedom from bond defects. The glue applying means insures consistent delivery of the glue at a constant rate while the heating members 75 and 76 provide a degree of control over the temperature of the wood and glue not heretofore possible.

A further and important advantage of the glue applying means resides in the ease with which it may be disassembled for servicing or other required maintenance. When required, bushings 146 are readily removed by loosening nuts 148 and rotating dogs 145 clear. As indicated in FIGURE 3, shaft 36 has a collar 86 fixed at its left end. Thus, when the bushing 146 at that end of shaft 36 is removed, shaft 36 is thereby withdrawn to the left carrying with it spacers 39 and gear-like members 37 due to collar 42 being fixed to the right thereof. Collar 43 on shaft 40 and the interengagement provided by gear-like members 41 and spacers 39 insures that shaft 40 and its appurtenances are led along and slid out of the casing to the left, as viewed in FIGURE 3. Shaft 36a is also provided with a collar at its left end as indicated at 86a in FIGURE 3. Each of the assemblies in casings 38 and 38a may be readily disassembled independently of the other with the gear-like members and spacers remaining in assembled relation on their respective shafts.

In FIGURE 10, there is shown a modification of the heating means disposed between the glue applying means 26 and the press 24. Heating members 90 and 91 may be electrical radiant heating members similar to heating members 25 and are connected to a source of electrical power through a rheostat as indicated in connection with members 75 and 76. Heating member 90 is positioned between feed paths 21 and 22 while heating member 91 is positioned between feed paths 22 and 23.

The terms and expressions which have been employed are used as terms of description and not of limitation, and there is no intention, in the use of such terms and expressions, of excluding any equivalents of the features shown and described or portions thereof, but it is recognized that various modifications are possible within the scope of the invention claimed.

I claim:

1. Apparatus for manufacturing a laminated composite wood product comprising means for feeding laminations along at least two converging paths to a bonding area, heating means along said paths in advance of said bonding area for heating said laminations as they pass along said paths towards said bonding area, means for applying a plurality of spaced thermosetting glue ribbons to at least one of said laminations intermediate said heating means and said bonding area, said glue applying means including a driven member for controlling the rate at which glue is fed therefrom to said one lamination, movable pressure means and means for moving the same at said bonding area for engaging and moving said laminations through said bonding area while pressing said laminations together with the thermosetting glue therebetween, means connected to said driven member and to said movable pressure means for driving said driven member at a rate in accordance with the rate at which said movable pressure means travels, and means intermediate said glue applying means and said movable pressure means for heating said laminations including means between said paths for heating the surface of said one lamination carrying said thermosetting glue ribbons.

2. Apparatus for manufacturing a laminated composite wood product comprising means for feeding laminations along at least two converging paths to a bonding area, heating means along said paths in advance of said bonding area for heating said laminations as they pass along said paths towards said bonding area, means for applying a plurality of spaced thermosetting glue ribbons to at least one of said laminations intermediate said heating means and said bonding area, said glue applying means including a driven member for controlling the rate at which glue is fed therefrom to said one lamination, movable pressure means and means for moving the same at said bonding area for engaging and moving said laminations through said bonding area while pressing said laminations together with the thermosetting glue therebetween, means connected to said driven member and to said movable pressure means for driving said driven member at a rate in accordance with the rate at which said movable pressure means travels, and at least one heating element extending between said converging paths intermediate said glue applying means and said movable pressure means and adjacent to the latter.

3. Apparatus for manufacturing a laminated composite wood product comprising means for feeding laminations along at least two converging paths to a bonding area, heating means along said paths in advance of said bonding area for heating said laminations as they pass along said paths towards said bonding area, means for applying a plurality of spaced thermosetting glue ribbons to at least one of said laminations intermediate said heating means and said bonding area, said glue applying means including a driven member for controlling the rate at which glue is fed therefrom to said one lamination, movable pressure means and means for moving the same at said bonding area for engaging and moving said laminations through said bonding area while pressing said laminations together with the thermosetting glue therebetween, means connected to said driven member and to said movable pressure means for driving said driven member at a rate in accordance with the rate at which said movable pressure means travels, a plurality of heating elements extending between said converging paths intermediate said glue applying means and said movable pressure means, and electric circuit means connected to said heating elements for supplying electric current thereto.

4. Apparatus for manufacturing a laminated composite wood product comprising means for feeding laminations along at least two converging paths to a bonding area, heating means along said paths in advance of said bonding area for heating said laminations as they pass along said paths towards said bonding area, means for applying a plurality of spaced thermosetting glue ribbons to at least one of said laminations intermediate said heating means and said bonding area, said glue applying means including a driven member for controlling the rate at which glue is fed therefrom to said one lamination, movable pressure means and means for moving the same at said bonding area for engaging and moving said laminations through said bonding area while pressing said laminations together with the thermosetting glue therebetween, means connected to said driven member and to said movable pressure means for driving said driven member at a rate in accordance with the rate at which said movable pressure means travels, a heating member juxtaposed with said laminations intermediate said glue applying means and said movable pressure means, said heating member having a plurality of channels formed along the surface thereof presented towards said one lamination with each of said channels being aligned with one of said thermosetting glue ribbons, and means for heating said heating member.

5. Apparatus for manufacturing a laminated composite wood product comprising means for feeding laminations along at least two converging paths to a bonding area, heating means along said paths in advance of said bonding area for heating said laminations as they pass along said paths towards said bonding area, means for applying a plurality of spaced thermosetting glue ribbons to at least one of said laminations intermediate said heating means and said bonding area, said glue applying means including a driven member for controlling the rate at which glue is fed therefrom to said one lamination, movable pressure means and means for moving the same at said bonding area for engaging and moving said laminations through said bonding area while pressing said laminations together with the thermosetting glue therebetween, means connected to said driven member and to said movable pressure means for driving said driven member at a rate in accordance with the rate at which said movable pressure means travels, a heating member juxtaposed with said laminations intermediate said glue applying means and said movable pressure means, said heating member being adjacent to said movable pressure means and having a plurality of channels formed along the surface thereof presented towards said one lamination with each channel aligned with one of said thermosetting glue ribbons, said heating member having at least one bore formed therein, and an electrical heating element mounted in the bore of said heating member.

6. In an apparatus for manufacturing a laminated composite wood product having means for feeding laminations along at least two converging paths to a bonding area, a plurality of elongated tubular members extending in spaced relation adjacent at least one of said paths and each having an end thereof presented towards the surfaces of laminations travelling said one path, means for delivering measured amounts of thermosetting glue and forcing the same along each of said tubular members to said ends thereof, the width of the bore of each of said tubular members being substantially smaller than the width of the laminations travelling said one path so that the glue issues from said tubular members in narrow widely spaced ribbons which cover only a relatively small portion of the surface area of the laminations to which the glue is applied, and means for varying the rate at which the glue is fed along each of said tubular members in accordance with the rate at which the laminations are fed along said paths.

7. In an apparatus for manufacturing a laminated composite wood product having means for feeding laminations along at least two converging paths to a bonding area, a plurality of elongated tubular members extending in spaced relation adjacent at least one of said paths and each having an end thereof presented towards the surfaces of laminations travelling said one path, means for delivering measured amount of thermosetting glue and forcing the same along each of said tubular members to said ends thereof, the width of the bore of each of said tubular members being substantially smaller than the width of the laminations travelling said one path so that the glue issues from said tubular member in narrow widely spaced ribbons which cover only a relatively small portion of the surface area of the laminations to which the glue is applied, means for varying the rate at which the glue is fed along each of said tubular members in accordance with the rate at which the laminations are fed along said paths, and heating means along said paths in advance of said bonding area for heating said laminations including means between said paths for heating the surfaces of the laminations with glue applied thereto.

References Cited in the file of this patent

UNITED STATES PATENTS

| Number | Name | Date |
| --- | --- | --- |
| 1,641,403 | Van Derhoef | Sept. 6, 1927 |
| 1,978,807 | Merritt | Oct. 30, 1934 |
| 2,035,650 | Gustafson | Mar. 31, 1936 |
| 2,102,937 | Bauer | Dec. 21, 1937 |
| 2,338,635 | Galber | Jan. 4, 1944 |
| 2,387,631 | Weir | Oct. 23, 1945 |
| 2,474,254 | Kauffman | June 28, 1949 |
| 2,588,874 | Quick | Mar. 11, 1952 |
| 2,694,963 | MacDonald | Nov. 23, 1954 |
| 2,722,735 | Beamish | Nov. 8, 1955 |
| 2,729,584 | Foster | Jan. 3, 1956 |

FOREIGN PATENTS

| Number | Country | Date |
| --- | --- | --- |
| 92,535 | Sweden | June 8, 1938 |